US008464582B2

(12) United States Patent
Roux et al.

(10) Patent No.: US 8,464,582 B2
(45) Date of Patent: Jun. 18, 2013

(54) VARIABLE THROAT VENTURI FLOW METER HAVING A PLURALITY OF SECTION-VARYING ELEMENTS

(75) Inventors: Gilles Roux, Sainte Genevieve des Bois (FR); Céline Gabard-Cuoq, Palaiseau (FR); Stéphane Chareille, Antony (FR); Pierre Mouget, Sèvres (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 297 days.

(21) Appl. No.: 12/808,203

(22) PCT Filed: Nov. 14, 2008

(86) PCT No.: PCT/EP2008/010649
§ 371 (c)(1),
(2), (4) Date: Sep. 20, 2010

(87) PCT Pub. No.: WO2009/077151
PCT Pub. Date: Jun. 25, 2009

(65) Prior Publication Data
US 2011/0185805 A1  Aug. 4, 2011

(30) Foreign Application Priority Data

Dec. 17, 2007 (EP) .................................. 07291535

(51) Int. Cl.
*E21B 47/10* (2012.01)
*G01F 1/44* (2006.01)

(52) U.S. Cl.
USPC .................... 73/152.29; 166/91.1; 73/861.63

(58) Field of Classification Search
None
See application file for complete search history.

(56) References Cited

U.S. PATENT DOCUMENTS

| 3,724,503 | A | * | 4/1973 | Cooke | 73/861.63 |
| 3,795,145 | A | * | 3/1974 | Miller | 73/861.53 |
| 4,096,211 | A | | 6/1978 | Rameau | |
| 4,757,709 | A | | 7/1988 | Czernichow | |
| 4,856,344 | A | | 8/1989 | Hunt | |
| 5,048,327 | A | * | 9/1991 | Atwood | 73/114.33 |
| 5,608,170 | A | | 3/1997 | Atkinson et al. | |
| 5,736,650 | A | | 4/1998 | Hiron et al. | |
| 5,880,378 | A | * | 3/1999 | Behring, II | 73/861.53 |
| 6,097,786 | A | | 8/2000 | Groves et al. | |
| 6,629,564 | B1 | | 10/2003 | Ramakrishnan et al. | |
| 6,860,325 | B2 | | 3/2005 | Ramakrishnan et al. | |
| 6,874,374 | B2 | | 4/2005 | Richards et al. | |
| 6,959,763 | B2 | | 11/2005 | Hook et al. | |
| 6,993,979 | B2 | | 2/2006 | Segeral | |
| 7,251,925 | B2 | * | 8/2007 | Paradise | 60/39.281 |
| 2005/0033530 | A1 | | 2/2005 | Stephenson et al. | |
| 2006/0080961 | A1 | * | 4/2006 | Paradise | 60/734 |
| 2006/0131014 | A1 | | 6/2006 | Huang et al. | |
| 2007/0062307 | A1 | * | 3/2007 | Jones | 73/861.63 |
| 2007/0251952 | A1 | * | 11/2007 | Paradise | 222/71 |
| 2008/0319685 | A1 | * | 12/2008 | Xie et al. | 702/45 |
| 2010/0300413 | A1 | * | 12/2010 | Ulrey et al. | 123/518 |

FOREIGN PATENT DOCUMENTS

| EP | 0206855 | 1/1991 |
| GB | 2186981 | 8/1987 |
| WO | 9702594 | 1/1997 |
| WO | 2006094694 | 9/2006 |

* cited by examiner

*Primary Examiner* — Harshad R Patel
(74) *Attorney, Agent, or Firm* — Cameron R. Sneddon; Schlumberger Technology Corporation

(57) ABSTRACT

A variable throat Venturi flow meter includes an upstream pipe section having an upstream cross-sectional area, a throat section having a variable throat cross-sectional area that is smaller than the upstream cross-sectional area, and a plurality of section-varying elements adapted to temporarily vary the throat cross-sectional area to allow a downhole tool to pass through the throat section.

3 Claims, 5 Drawing Sheets

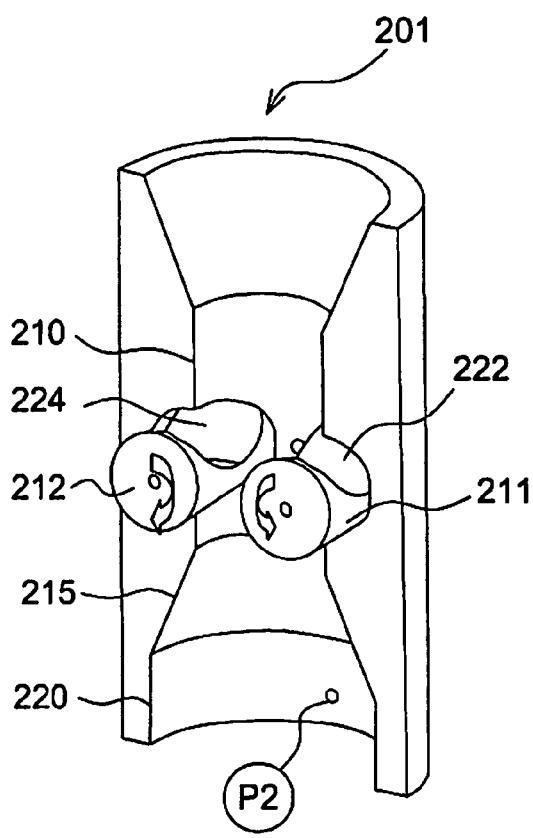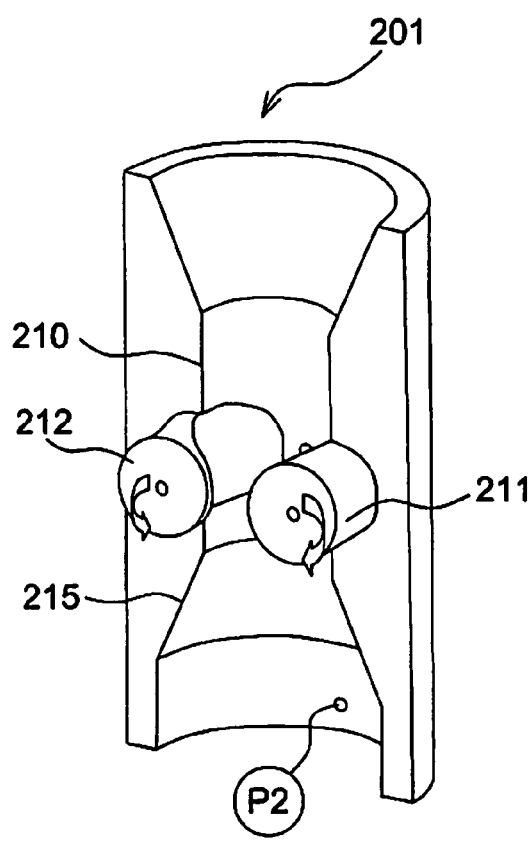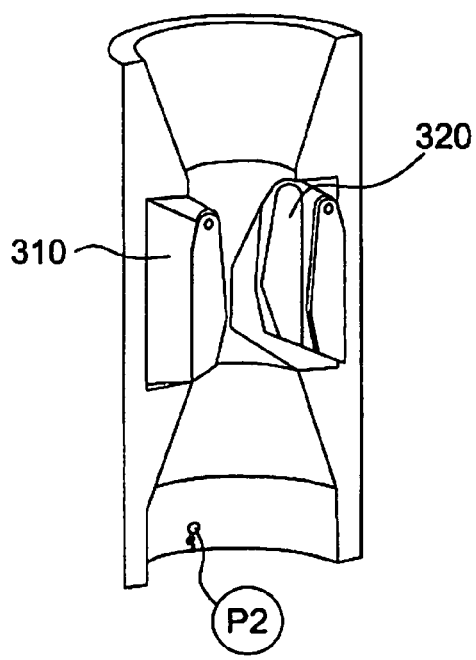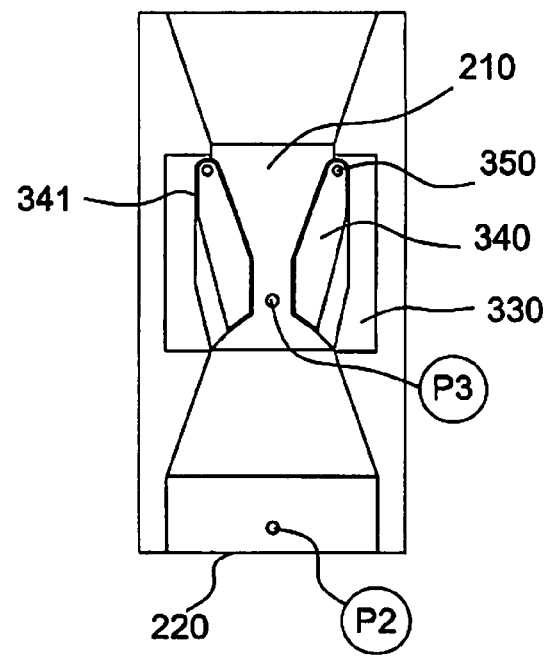

VARIABLE THROAT VENTURI FLOW METER HAVING A PLURALITY OF SECTION-VARYING ELEMENTS

BACKGROUND OF INVENTION

1. Field of the Invention

The invention relates generally to an apparatus for measuring flow rates in a fluid, such as in oil and gas wells.

2. Background Art

Venturi flow meters are commonly used to measure flow rates in multiphase fluids in a well bore, such as oil, gas, and water produced from hydrocarbon underground reservoirs. An example of such a flow meter is disclosed in U.S. Pat. No. 4,856,344. The basic premise of a Venturi flow meter is to introduce a restriction in the flow path. The restriction is commonly referred to as the "throat." Fluid pressure is measured in the throat and at a location upstream of that restriction. Because the flow area in the throat is smaller than the upstream portion, the velocity of the fluid increases, which results in a corresponding decrease in pressure in the throat, according to the well known Bernoulli principle according to which the total energy in a steadily flowing fluid system is a constant along a flow path. By comparing the two pressure readings and the respective cross-sectional areas, a flow rate can be determined using the relationship between fluid velocity and pressure.

FIG. 1 shows a basic layout of a typical Venturi flow meter 100 disposed within a pipe 101 that can be used in a well bore. The upward flow direction of the fluid through the flow meter is shown by arrow F. The primary portions are an upstream section 120 and a throat section 110. A convergent tapered section 115 connects the upstream section 120 and the throat section 110. The convergent tapered section 115 provides a smooth reduction in diameter between the larger upstream section 120 and the smaller throat section 110 in order to minimize turbulence in the flow meter. Downstream of the throat section 110, a divergent tapered section 130 provides a smooth transition to the larger downstream section 140, which reduces the fluid velocity and minimizes turbulence and associated pressure losses. A pressure gauge P3 measures the fluid pressure in the throat section 110 where the diameter is D2. Another pressure gauge P2 measures the fluid pressure in the upstream section 120 at a point upstream of the convergent tapered section 115 at a point where the pipe diameter is D1. The ratio of the diameter D2 over the diameter D1 is known as the Beta ratio of the Venturi flow meter and is generally about 0.5. Taking into account the Beta ratio, a comparison between the two pressure gauges P2 and P3 provides a differential pressure, which allows for the determination of the flow rate of the fluid based on well known equations.

In addition to flow rate measurements, a typical Venturi flow meter may further include a gradiomanometer to determine the density of a multiphase fluid. To determine the average density of the multiphase fluid, a differential pressure is taken between two pressure gauges P1 and P2 located in the upstream section 120 of the flow meter 100 and separated by a distance H1. The differential pressure correlates with the average density of the multiphase fluid between the two pressure gauges P1 and P2.

In a typical oil well, inside the wellbore where the hydrocarbon fluid is flowing, the fluid flow rate may vary significantly, especially during transient periods of testing and production. In particular, when carrying out drill stem testing (DST), which is used to evaluate the production potential of hydrocarbon reservoirs, the fluid flow rate may be lower than expected or vary widely. Thus, the pressure differential between the throat section and the upstream section may be too small so that accurate flow rate measurement results may not be obtained. In order to increase the pressure differential and thus to be able to accurately measure small flow rates, the cross-sectional area of the throat section is made to be very small. However, if the cross-sectional area of the throat section is very small, various downhole tools will not pass through the Venturi flow meter. For example, production logging tools and firing guns deployed by wireline may have a maximum diameter of over 5 cm (2 in.), making it impossible for those tools to pass through the small throat section. This is one of the reasons why conventional flow meters have not been used successfully downhole in a wellbore, and typically, the flow rate has to be measured at the surface.

SUMMARY OF INVENTION

The present invention relates to a variable throat Venturi flow meter that overcomes the cited and other limitations of the prior art. The variable throat Venturi flow meter according to the invention provides a new way of measuring the fluid velocity inside the wellbore. In addition, by varying the throat cross-section in accordance with embodiments of the present invention, the throat cross-section can be adjusted to accommodate the passing of downhole tools and to accommodate widely variable flow rates inside the wellbore.

In a first aspect, the invention relates to a flow meter comprising an upstream pipe section having an upstream cross-sectional area, a throat section having a throat cross-sectional area that is smaller than the upstream cross-sectional area, and a plurality of section-varying elements adapted to temporarily vary the throat cross-sectional area to allow a downhole tool to pass through the throat section.

In a second aspect, the invention relates to a method of measuring a flow rate in a well bore. The method includes deploying a variable throat Venturi flow meter in the well bore. The variable throat Venturi flow meter includes a throat section of which the throat cross-sectional area is variable between a first throat cross-sectional area and a second throat cross-sectional area, wherein the first throat cross-sectional area is smaller than the second throat cross-sectional area. A flow rate is determined using pressure measurements provided by the variable throat Venturi flow meter using the first throat cross-sectional area. The throat cross-sectional area is temporarily varied to have the second throat cross-sectional area to allow a downhole tool to pass through the throat section.

Other aspects, characteristics, and advantages of the invention will be apparent from the following detailed description and the appended claims.

BRIEF DESCRIPTION OF DRAWINGS

FIGS. 2-4 show a variable throat Venturi flow meter in accordance with a first embodiment of the present invention.

FIGS. 5 and 6 show a variable throat Venturi flow meter in accordance with a second embodiment of the present invention.

DETAILED DESCRIPTION

In a first aspect, the present invention provides a variable throat Venturi flow meter comprising an upstream section with a substantially constant cross-sectional area and a throat section with a variable cross-sectional area.

The cross-sectional area of the throat section of the variable throat Venturi flow meter according to the invention may vary and can be readily adjusted to accommodate the expected flow rate to be measured. For example, if the flow rate is low, a smaller throat cross-sectional area is needed to provide accurate flow measurements. As the flow rate may increase, the cross-sectional area of the variable throat Venturi flow meter may also increase.

Figure 1:
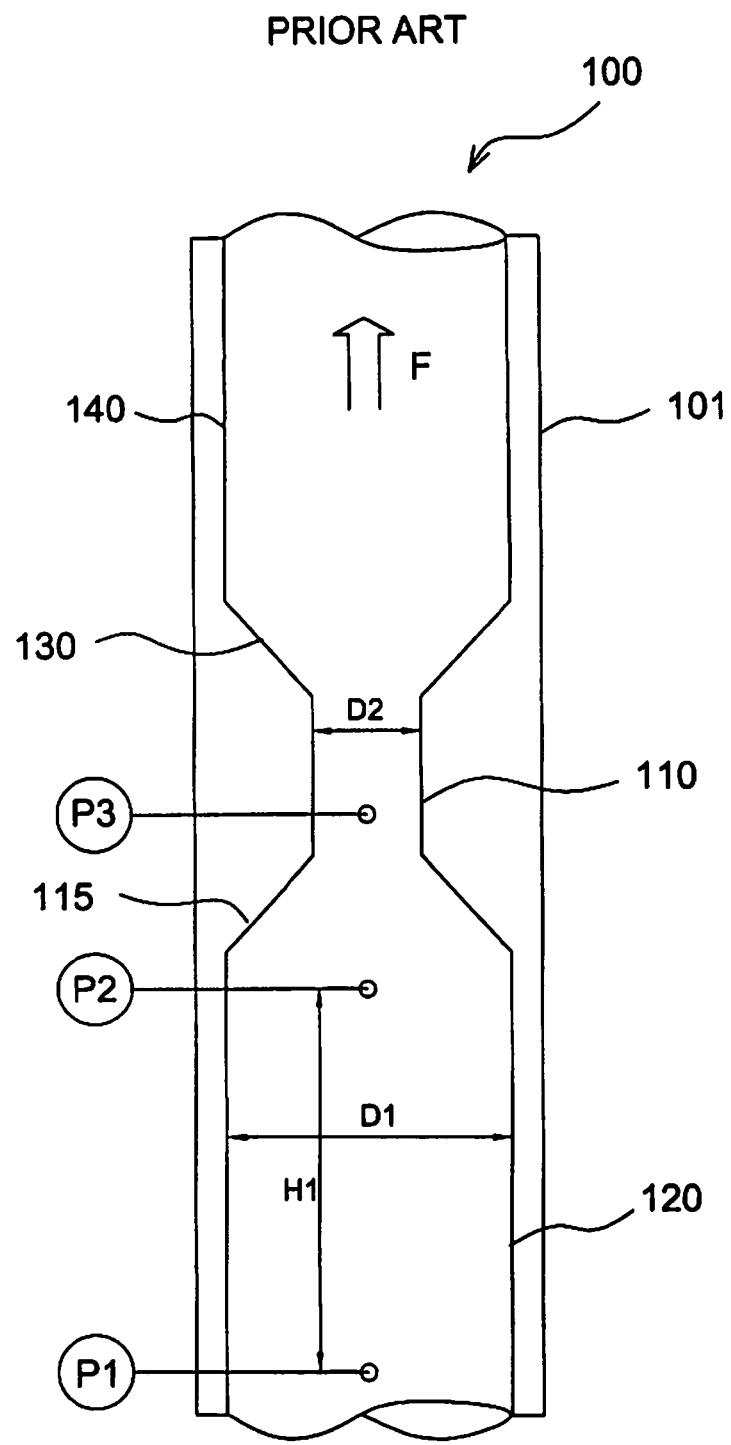
FIG. 1 shows a prior art Venturi flow meter.
Figure 2:
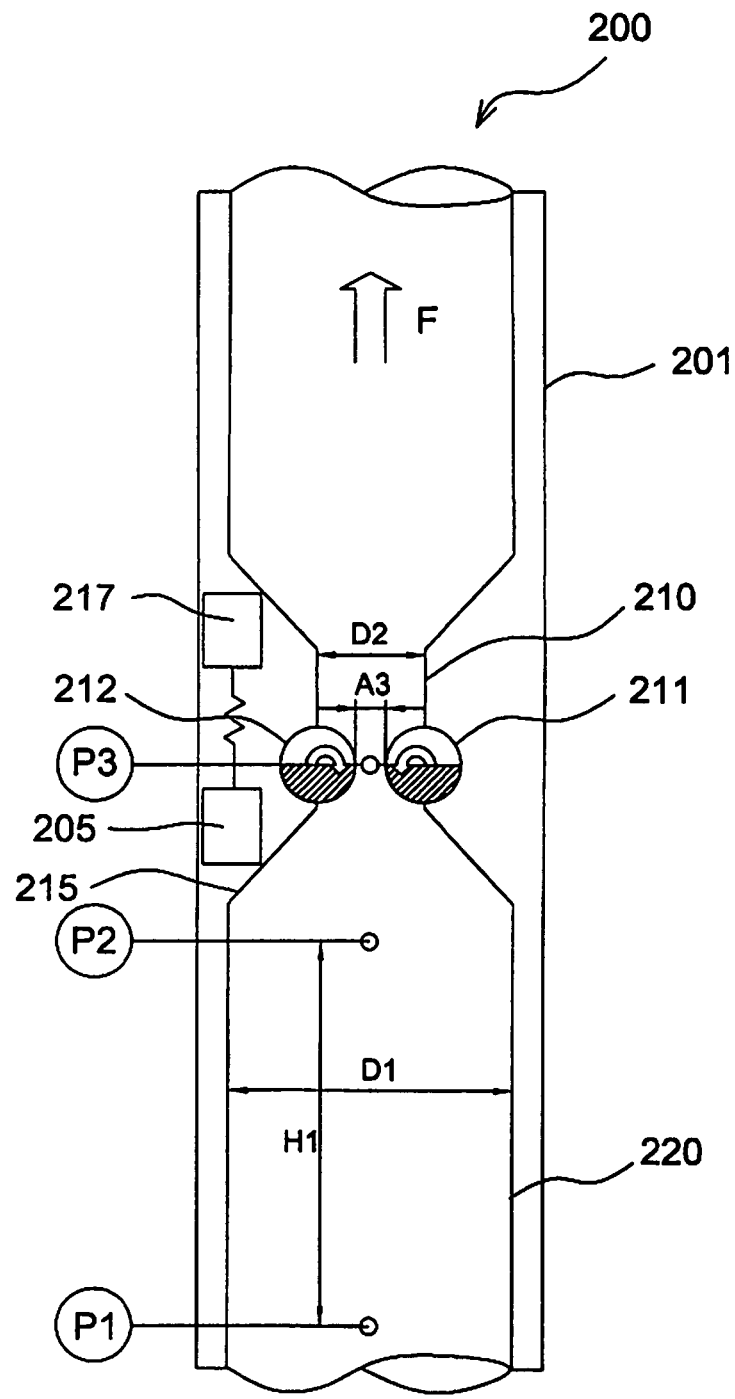

Turning to FIGS. 2-4, a variable throat Venturi flow meter 200 in accordance with a first embodiment of the invention is shown. FIG. 2 is a cross-section of the flow meter. FIGS. 3 and 4 are perspective views of the flow meter (partial view). The variable throat Venturi flow meter 200 comprises an upstream section 220 and a throat section 210. In this embodiment, a convergent tapered section 215 connects the upstream section 220 and the throat section 210. The throat section 210 includes a pair of rotatable inserts 211 and 212. The rotating inserts 211 and 212 are generally cylindrical in shape, with their principal axes being perpendicular to the principal axis of the flow meter, i.e., the flow direction F. In order to vary the cross-sectional area of the throat section 210, each of the rotatable inserts 211 and 212 includes a cut-out portion 222 and 224, respectively. The cut-out portions 222 and 224 may be of a half-cylindrical form such as that the principal axes of the cut-out portions 222 and 224 are orthogonal to the principal axes of the rotatable inserts 211 and 212, as shown in FIGS. 3 and 4.

In FIGS. 2 and 3, the rotatable inserts 211 and 212 are in the "closed" position. In FIG. 4, the rotatable inserts 211 and 212 are in the "open" position. In the closed position, the throat cross-sectional area is reduced to area A3. In the particular embodiment shown in FIGS. 2-4, the cut-outs 222 and 224 are formed to substantially match the diameter D2 of the throat section 210 such that a substantially cylindrical throat section is provided when the rotatable inserts 211 and 212 are in the open position. The actuation of the rotatable inserts 211 and 212 may be performed using a variety of mechanisms such as using spring actuators (not shown) or an electric motor 205, or any other actuation mechanism known in the art. The actuation may be initiated, for example, in response to pressure or electrical signals interpreted by a controller system 217 integrated in the flow meter 200 and/or by lowering a downhole tool into the flow meter 200 until it reaches the rotatable inserts 211 and 212, which may respond by rotating into the open position. In the closed position, during flow periods, the throat cross-sectional area may also be adjusted continuously by a controller system linked to a continuous real-time differential pressure measurement.

In the embodiment shown in FIGS. 2-4, the open position provides a full throat opening. In downhole use, the flow meter 200 may be deployed in the open position. Should the flow rate decrease, the rotatable inserts 211 and 212 may be rotated partially towards or completely to the closed position, thus reducing the throat cross-sectional area, thereby providing an increase in differential pressure between pressure gauges P2 and P3. In the closed or partially closed position, the throat cross-section may be non-circular, which is the case in the present embodiment. Although this somewhat complicates the Beta ratio by not being a comparison of diameters, an effective Beta ratio can be provided by comparing the effective throat cross-sectional area with the cross-sectional area of the upstream section 220. Experimental data may be needed to compensate for irregular flow through the non-circular throat cross-section when the rotatable inserts 211 and 212 are in the closed or partially closed positions. Preferably, the edges of the rotatable inserts 211 and 212 should be curved or rounded to reduce or eliminate turbulence and to improve accuracy in the pressure readings.

Turning now to FIGS. 5 and 6, a second embodiment of the variable throat Venturi flow meter in accordance with the present invention is shown. As with the previous embodiment, the throat cross-section may be varied. The throat cross-section is varied using revolving inserts 340 and 341 disposed in a rotatable sleeve 330. The revolving inserts 340 and 341 include pivots 350 at an upper location. An angled ramp 310 is provided on the back side of the revolving inserts 340 and 341 and/or on the inside of the sleeve 330. Because of the angled ramp 310, rotation of the sleeve 330 causes the revolving inserts 340 and 341 to be alternately forced inward (i.e., closed position, FIG. 6) or allowed to open outward (i.e., open position, FIG. 5). In the embodiment shown in FIGS. 5 and 6, the revolving inserts 340 and 341 include cut-outs 320, which may provide a substantially circular throat cross-section in the closed position when the revolving inserts 340 and 341 are brought inwardly together. Because of the irregular throat cross-section and void behind the revolving inserts 340 and 341, this embodiment may prove unsuitable to provide accurate flow measurements when the revolving inserts 340 and 341 are in the open position. However, the open position allows for the deployment of downhole tools through the flow meter that are too large to pass through the flow meter when the revolving inserts 340 and 341 are in the closed position. Accordingly, the embodiment shown in FIGS. 5 and 6 provides accurate flow rate measurements for low flow rates in the closed position, while still allowing for downhole tools to be deployed past the flow meter.

The revolving inserts 340 and 341 may be actuated in response to the force of the downhole tool or command signals communicated to a controller system (not shown). In one embodiment, the sleeve 330 is spring loaded so as to be biased towards the closed position to provide flow rate measurements. The force of the springs (not shown) may be selected to be sufficiently stiff to be stable during flow rate measurements, but weak enough to allow the weight of various downhole tools to force the revolving inserts 340 and 341 into the open position. Upon removal of the downhole tool, the revolving inserts 340 and 341 would automatically return to the closed position to allow for continued flow rate measurements. Alternatively, an actuator (not shown) may rotate the sleeve 330 between the open and closed positions.

Figure 7A:
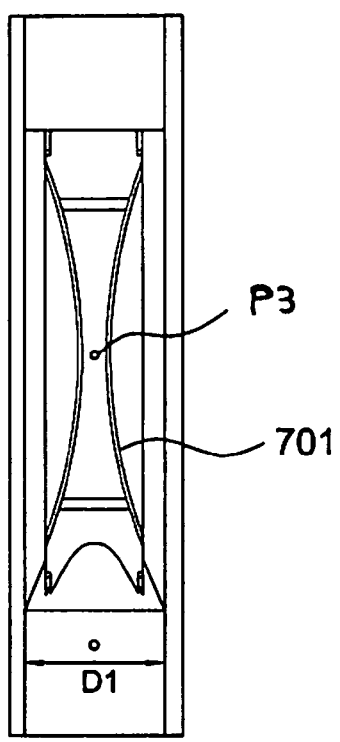
FIGS. 7a and 7b show a variable throat Venturi flow meter in accordance with a third embodiment of the present invention.
Figure 7B:
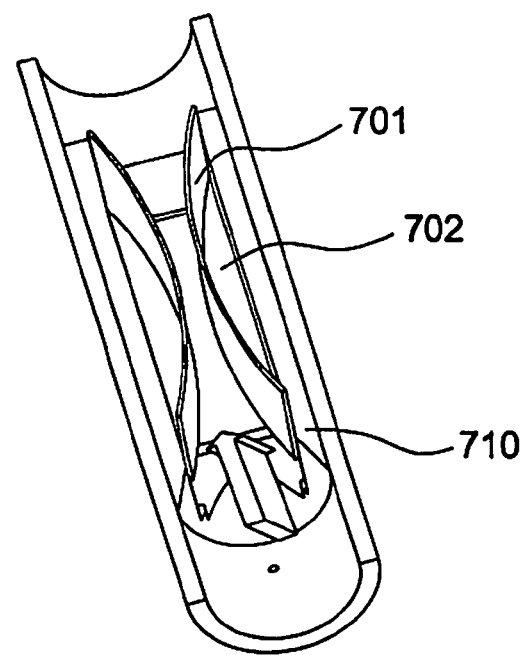

In FIGS. 7a and 7b, a third embodiment of the variable throat Venturi flow meter in accordance with the present invention is shown. In this embodiment, the throat cross-section is varied by providing spring blades 701 in the throat section. The spring blades 701 are inwardly biased to restrict the flow through the throat section, which provides the differential pressure necessary for flow rate measurements. The spring blades 701 provide a simple variable throat section by simultaneously providing the convergent and divergent tapered sections of the variable throat Venturi flow meter. The spring blades 701 are selected to be flexible enough to be forced outwardly by various downhole tools, but stiff enough to return to the inward, closed position upon removal of the downhole tool. Dead volumes 702 between the backside of the spring blades 701 and a throat body 710 may be filled with highly viscous fluids or materials under pressure to avoid interfering with the multiphase fluid passing through the flow meter. For example, a highly viscous fluid may be enclosed in two recipients (not shown). The recipients should be of an elastic, non-corrosive material, and they may respectively be attached to the throat body 710 at the backside of each spring blade 701. Another example could be open cells with foams or gels. The spring blades 701 thus respond to axial forces. The axial forces are exercised by downhole tools passing through the throat section and forcing outwardly the spring blades 701 and by the viscous fluid driving back the spring blades 701.

Figure 8A:
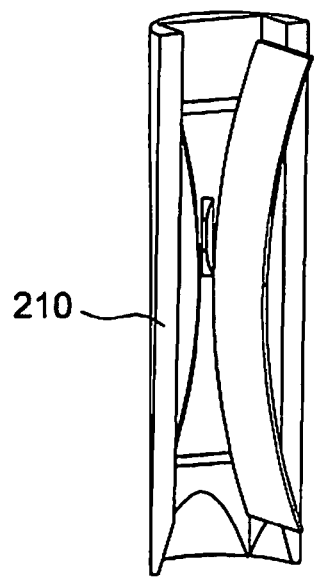
FIGS. 8a and 8b show a variable throat Venturi flow meter in accordance with a fourth embodiment of the present invention.
Figure 8B:
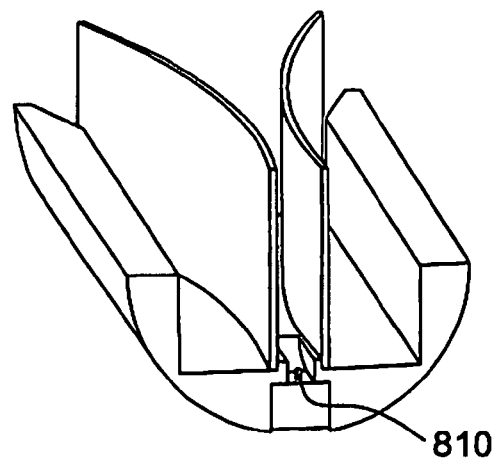

FIGS. 8a and 8b show a preferred embodiment of the invention that combines a variable throat Venturi flow meter according to the third embodiment with a density/viscosity sensor. The density/viscosity sensor 810 is positioned in the throat section 210, thus providing a direct single- or multiphase fluid density measurement at the Venturi throat. This density/viscosity sensor design may be based on micro resonator technology, thus being small enough to be inserted into the throat section 210 without affecting the flow rate measurements.

In the embodiments disclosed herein, the pressure difference may also be measured using a differential pressure sensor disposed in the throat section, instead of using the pressure gauges P2 and P3 in the upstream section and the throat section, respectively. Further, the pressure sensors (P1, P2, P3) may not be directly disposed in the Venturi flow meter. For example, an upstream port may be disposed in the upstream pipe section (220) and be in communication with the first pressure sensor (P2) and a throat port may be disposed in the throat section (210) and be in communication with the second pressure sensor (P3)

In a second aspect, the invention provides a method of measuring a flow rate in a well bore. The method comprises lowering and installing a variable throat Venturi flow meter according to embodiments of the invention into the wellbore. The variable throat section of the flow meter has a throat cross-sectional area that is variable between a first throat cross-sectional area and a second throat cross-sectional area, wherein the first throat cross-sectional area is smaller than the second throat cross-sectional area. The flow rate is then determined using pressure measurements provided by the variable throat Venturi flow meter when the throat section has the first throat cross-sectional area. By temporarily varying the throat cross-sectional area to have the second throat cross-sectional area, a downhole tool is able to pass through the throat section. Once the downhole tool has been withdrawn, the throat cross-sectional area can be re-adjusted to the first throat cross-sectional area.

The throat cross-sectional area of the flow meter may be adjusted in such a way that the differential pressure is kept constant or only slightly varying. Thus, a discharge coefficient and Reynolds number variation can be minimized. The flow rate of a single phase liquid across the flow meter may then be determined by using the following fluid equation:

$$Q = CA\varepsilon\sqrt{\frac{2\Delta p}{\rho}}, \quad (1)$$

where Q is the flow rate, C is the discharge coefficient which is a function of the Reynolds number, A is the throat cross-sectional area, E is expansibility factor, $\Delta p$ is a pressure difference across the venturi, and $\rho$ is the fluid density.

To calculate Q using equation (1), the pressure difference $\Delta p$ is measured using two pressure gauges disposed in the throat section and in the upstream section of the flow meter. For a single-phase liquid flow the expansibility factor $\epsilon$ can be approximated to 1. Since the discharge coefficient C cannot be calculated with certainty, it is generally determined through experimentation. It may vary over a wide range as a function of the Reynolds number. Adjusting the throat cross-sectional area A as a function of the pressure difference $\Delta p$ will minimize the Reynolds number variation and therefore minimize the error and uncertainty on the discharge coefficient C. Thus, the flow rate may also be determined with greater certainty.

Figure 9:
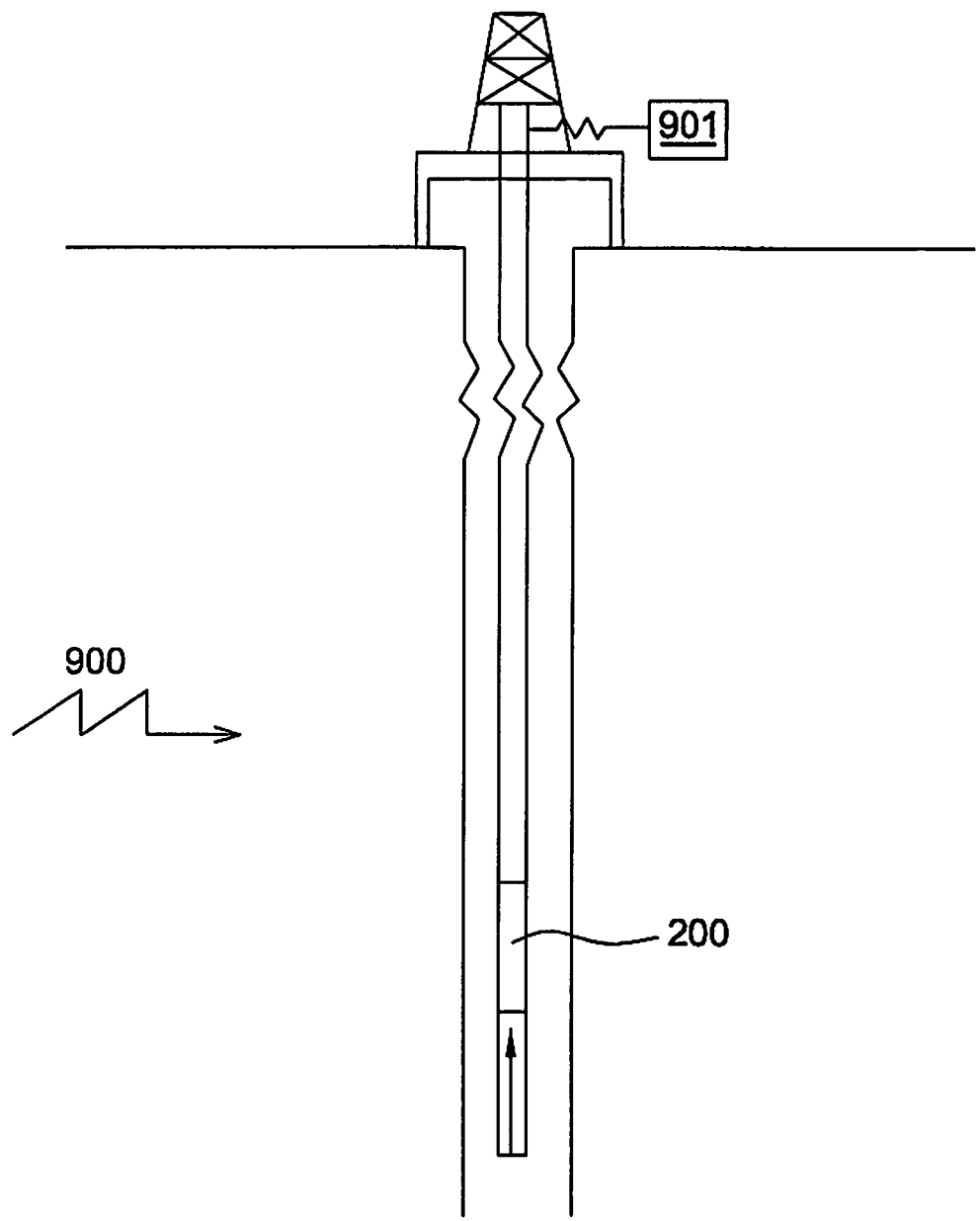
FIG. 9 shows a downhole flow rate testing system in accordance with an embodiment of the present invention.

Referring now to FIG. 9, a wellbore comprising a downhole flow testing system 900 is schematically shown. The downhole flow testing system 900 comprises the variable throat Venturi flow meter 200 according to the invention and a command module 901. The controller system (217, FIG. 2) of the variable throat Venturi flow meter 200 is configured to receive open and close signals from the command module 901 in order to vary the cross-sectional area of the throat section of the flow meter.

Embodiments of the present invention may provide one or more of the following advantages. The ability to vary the throat cross-sectional area in situ avoids the need to remove the flow meter from the wellbore to replace the flow meter. This allows for the throat to be varied according to flow rates experienced in the wellbore. Further, low flow rates can be measured by reducing the throat cross-sectional area without the disadvantage of then being unable to accommodate downhole tools because the reduction is easily reversible in situ.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of measuring a flow rate in a well bore, the method comprising: deploying a variable throat Venturi flow meter in the wellbore, the variable throat Venturi flow meter comprising a throat section having a throat cross-sectional area that is variable between a first throat cross-sectional area and a second throat cross-sectional area, wherein the first throat cross-sectional area is smaller than the second throat cross-sectional area; determining the flow rate using pressure measurements provided by the variable throat Venturi flow meter when the throat section has the first throat cross-sectional area; and temporarily varying the throat cross-sectional area to have the second throat cross-sectional area to allow a downhole tool to pass through the throat section.

2. The method of claim 1, wherein the varying the throat cross-sectional area is in response to an axial force exerted by the downhole tool.

3. The method of claim 1, wherein the varying the throat cross-sectional area is in response to a command signal.

* * * * *